No. 829,110. PATENTED AUG. 21, 1906.
D. KISER.
DRIVING MECHANISM FOR VEHICLES AND THE LIKE.
APPLICATION FILED DEC. 4, 1905.

2 SHEETS—SHEET 1.

WITNESSES:
S. C. Duvall.
H. R. Marlatt.

D. KISER,
INVENTOR.
BY Robert D. Randle
ATTORNEY.

No. 829,110. PATENTED AUG. 21, 1906.
D. KISER.
DRIVING MECHANISM FOR VEHICLES AND THE LIKE.
APPLICATION FILED DEC. 4, 1905.

2 SHEETS—SHEET 2.

WITNESSES:
S. C. Duvall.
H. R. Marlatt.

D. KISER,
INVENTOR.
BY
ATTORNEY.

UNITED STATES PATENT OFFICE.

DANIEL KISER, OF RICHMOND, INDIANA.

DRIVING MECHANISM FOR VEHICLES AND THE LIKE.

No. 829,110.   Specification of Letters Patent.   Patented Aug. 21, 1906.

Application filed December 4, 1905. Serial No. 290,183.

*To all whom it may concern:*

Be it known that I, DANIEL KISER, a citizen of the United States, residing in the city of Richmond, in the county of Wayne, and in the State of Indiana, have invented a new and useful Driving Mechanism for Vehicles or the Like, of which the following is a specification, such as will enable others skilled in the art to which it appertains to make and use the same.

My invention relates to a driving mechanism for operating vehicles or the like by hand or body power—such, for instance, as children's wagons, hand-cars operative on rails, and for operating tools or other devices.

The particular objects I have in view in this invention is to provide a mechanism which will be simple in construction and operation, positive in action, easily operated and controlled, and which will be capable of a wide scope of usefulness and efficiency in the accomplishment of the results for which it is intended.

I secure the desired objects by the employment of certain constructional features and combinations of parts, all of which will be hereinafter fully set forth in minutia.

In order to illustrate the principles of my invention most clearly and in a practical manner and to show a specific application of the principles thereof, I have in the accompanying drawings shown the invention as applied to a child's wagon.

Figure 1:
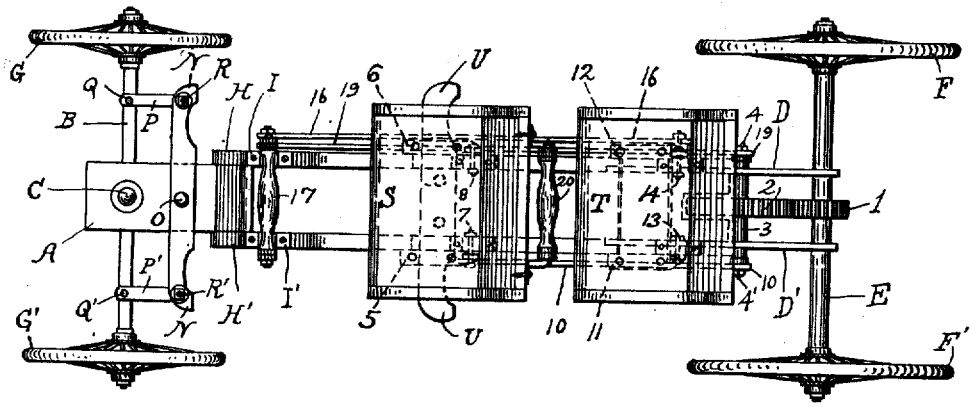
Figure 2:
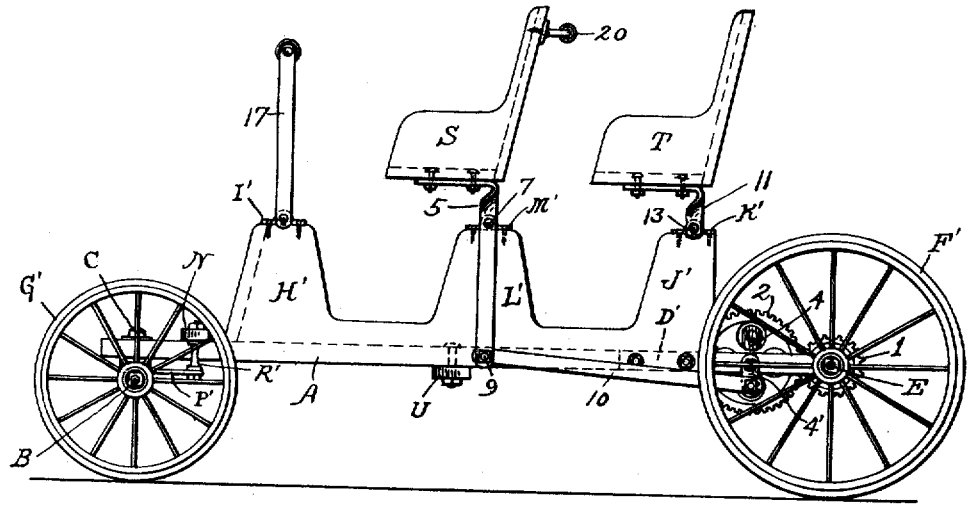
Figure 3:
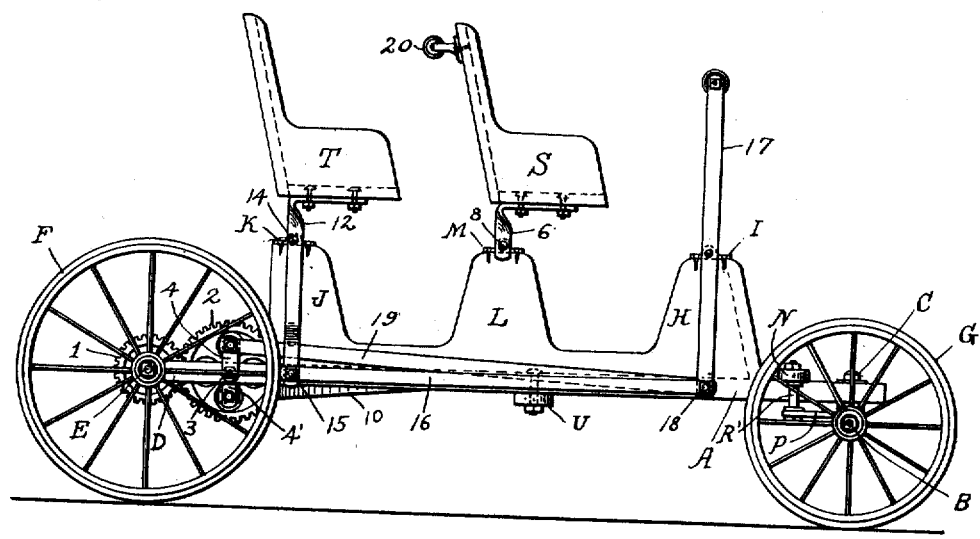
Figure 4:
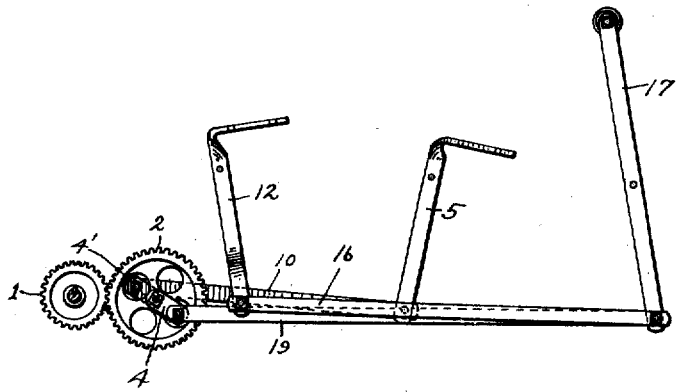

Referring now to the drawings, in Figure 1 I have shown a plan view of my invention in connection with a wagon. Fig. 2 shows a left-hand side elevation thereof. Fig. 3 shows a right-hand side elevation thereof, and Fig. 4 shows a detail elevation of the essential features.

Similar indicia denote like parts throughout the several views of the accompanying two sheets of drawings.

In order that my invention may be more readily understood and its advantages fully appreciated, I will now take up the detail description thereof and will describe the various parts and operations as briefly and as compactly as I may.

As herein shown, the letter A denotes the longitudinal bar or reach-pole, to the forward end of which is pivoted the front axle B, secured by the king-bolt C. Secured on the respective right and left sides and at the rear portion of the bar A are the bar-hangers D and D', which extend some distance to the rear parallel with each other, as shown, and in which is mounted revolubly the rear axle E. The rear wheels F and F' are secured on the outer end portions of the axle E either rigidly or resiliently, whereby they are carried revolubly with the axle E, and the front wheels G and G' are mounted revolubly on the outer end portions of the axle B. All of the above-mentioned parts form the running-gear and which may be variously changed and to which I make no claim.

Secured to and rising from each side and located on the forward portions of the bar A are the pedestal-hangers H and H', which are identical with each other and each carrying on its apex the boxings I and I', respectively. Secured to and rising from each side and located on the rearward portion of the bar A are the pedestal-hangers J and J', which are identical with each other and each carrying on its apex the boxings K and K', respectively, and secured to and rising from each side and located on the central portion of the bar A are the pedestal-hangers L and L', which are also identical with each other and each carrying on its apex the boxings M and M', respectively.

The steering may be by hand-tiller or by foot mechanism, the latter being preferable in this instance, and may be described as follows: Pivoted centrally on the bar A slightly in rear of the king-bolt C is the foot-bar N, being pivotally mounted thereto by the pivot-bolt O. The outer ends of the foot-bar N are connected to the axle B by the two parallel connecting-bars P and P', said bars having the forward ends pivoted to said axle A by the respective bolts Q and Q', and the rear ends of said bars are connected to the foot-bar N by the relatively long and downwardly-extending bolts R and R', respectively.

The letter U denotes the foot-rest for the person who may be seated on the rear seat, and it is secured to and extends out on either side of the bar A, as shown.

*Driving mechanism.*—Rigidly secured on the center of the shaft E is a driven gear-wheel 1, it of course being positioned between the two hangers D and D', which carry the axle E, on which axle said gear-wheel 1 is mounted. The numeral 2 denotes the drive gear-wheel, which gear meshes with the gear 1, as shown. The gear 2 is permanently mounted on its shaft 3, which latter is journaled in the two hangers D and D' forward of the rear axle E, as shown. The ends of the shaft 2 extend outwardly beyond the faces of the hangers D and D' and are provided with oppositely positioned cranks 4 and 4', the purposes of which will presently appear.

The letters S and T denote the respective front and rear seats. The front seat S is secured on the horizontal portions of the angle-bars 5 and 6, which bars are pivotally mounted to the boxings M and M', respectively, by the respective bolts 7 and 8. The angle-bar 6 terminates slightly below its pivotal point, while the angle-bar 5 extends down to approximately even with the bar A, where by means of the bolt 9 it is pivoted to the forward end of the connecting-bar 10. The rear end of the said connecting-bar 10 is pivoted to the crank 4', as shown in Fig. 2. By the above it is plain that the seat S acts as a leverage, whereby as it may be moved back and forth it will turn the crank and eventuate in turning the rear wheels.

Similar to the above is the operation of the rear seat T. The said rear seat T is secured on the horizontal portion of the angle-bars 11 and 12, which latter are pivotally mounted to the boxings K and K', respectively, by the respective bolts 13 and 14. The angle-bar 11 terminates slightly below its pivotal point, while the angle-bar 12 extends down to approximately even with the bar A, where by means of the bolt 15 it is pivoted to the rear end of the connecting-bar 16.

The numeral 17 denotes a hand-lever pivotally mounted near its center portion in the boxings I and I', its upper end being provided with a handhold and its lower end extending down to approximately even with the bar A, where by means of the bolt 18 it is pivoted to the forward end of said bar 16, and by same means it is pivoted to the forward end of the connecting-bar 19. The rear end of the said connecting-bar 19 is pivoted to the crank 4, as shown in Fig. 3. By the above it will be apparent that the seat T also acts as a leverage, acting contemporaneously with but with an oppositely-disposed movement from that of the said front seat, and also that the person seated in the front seat will be so positioned as to operate the lever 17, which acts contemporaneously with but with an oppositely-disposed movement from that of the front seat.

Secured on the back of the front seat is a handhold 20, which may be grasped by the person seated in the rear seat, whereby that person may have practically the same advantage in the propulsion of the vehicle as the person seated in the front seat.

It is apparent that the two seats S and T may be single seats, and that two persons seated in the two seats may each contribute to the propulsion of the vehicle, and thereby make the labor materially lighter than if it should be done by only one of the occupants, the mechanism described also materially assisting in the ease of operation. It is also apparent that the seats may be double seats, whereby four or more persons may each assist in the operation of propelling the vehicle, and it is also apparent that the device may be constructed with only one seat, or, if desired, even three seats may be arranged tandem and coupled up similar to the above, whereby each occupant may assist in the propulsion thereof.

While I have illustrated and described the best means known to me for the accomplishment of the objects of my invention in a practical manner, I desire that it be fully understood that various changes and modifications therein may be made to accommodate the principles involved to various purposes without departing from the principles of my invention, which I claim as new.

Having now fully shown and described my invention, what I claim, and desire to secure by Letters Patent of the United States, is—

1. In combination with a running-gear mounted on wheels, the pivoted seats S and T and the lever 17, and the gear-wheels 1 and 2, of the crank-shaft 3 on which the major gear-wheel is mounted, a crank carried by either end of said shaft, the connecting-bars 10, 16 and 19 for connecting the seats and the lever to the cranks of said shaft—whereby they may be rocked for the purpose of propelling the vehicle, all substantially as shown and described.

2. A driving mechanism for vehicles or the like, the combination, of the reach-bar A to the forward end of which is pivoted the axle B on which is revolubly mounted the front wheels as shown, a pair of hangers extending to the rear from said reach-bar, a rear axle carried revolubly in the rear ends of said hangers, wheels secured on the ends of said axle, a gear-wheel mounted centrally on the rear axle and operative between said hangers, a larger gear-wheel meshing with the smaller gear-wheel, a shaft on which the larger gear-wheel is secured, oppositely-disposed cranks carried on the ends of said shaft, a pair of pivoted seats arranged tandem over the bar A, bars extending down from the seats, connecting-bars pivoted to the lower portions of the bars extending down from the seats and to the said cranks whereby as said shaft revolves the seats will rock back and forth alternately in opposite directions, and a hand-lever pivoted in front of the front seat and connected to the crank which operates the rear seat, all substantially as shown and described.

3. In combination with a vehicle-gear mounted on ground-wheels, a revoluble axle on which the rear wheels are secured, a pair of seats arranged tandemly over the vehicle-gear, means for pivoting the seats independent of each other to rock back and forth, a gear-wheel mounted on the rear axle, a second gear-wheel meshing with the first gear-wheel, a shaft on which the second gear-wheel is mounted, oppositely-disposed cranks secured on the ends of said shaft, a connecting-bar extending forward from each crank and each being pivoted to bars extending down from the seats, and a pivoted hand-lever connected to the crank for the rear seat, the hand-lever and the seats being adapted to rock back and forth alternately as the shaft revolves, all substantially as described.

4. In combination with a running-gear mounted on ground-wheels, the rear wheels being secured to an axle common to both and which revolves therewith, a pair of hangers extending to the rear in which the rear axle is mounted, a gear-wheel mounted on the rear axle between said hangers, a larger gear-wheel meshing with the first gear-wheel, a shaft on which the larger gear-wheel is secured, oppositely-disposed cranks carried on the ends of said shaft, a pair of pivotally-mounted seats and a pivotally-mounted hand-lever arranged tandem, each having a downwardly-projecting arm, and connecting-bars pivoted to the lower ends of said arms of the seats and of the hand-lever and to said cranks—thereby providing means whereby the two seats and the hand-lever will rock back and forth alternately in opposite directions, all substantially as shown and described.

In testimony whereof I have hereunto signed my name, this the 1st day of December, 1905, in the city of Richmond, Wayne county, Indiana.

DANIEL KISER.

Witnesses:
ROBERT W. RANDLE,
R. E. RANDLE.